United States Patent [19]

Yu

[11] 4,421,100
[45] Dec. 20, 1983

[54] THERMOSYPHON HEAT PIPE HOT WATER APPLIANCE

[75] Inventor: Ying-Nien Yu, Marina del Rey, Calif.

[73] Assignee: Ying Mfg. Corp., Gardena, Calif.

[21] Appl. No.: 333,424

[22] Filed: Dec. 20, 1983

[51] Int. Cl.³ .............................................. F24J 3/02
[52] U.S. Cl. ................................ 126/435; 126/433; 126/437
[58] Field of Search .............. 126/426, 433, 434, 400, 126/448, 435, 436, 437, 450, 417; 165/104.22, 104.24

[56] References Cited

U.S. PATENT DOCUMENTS

| 1,119,063 | | Burnap. | |
|---|---|---|---|
| 2,575,478 | | Wilson. | |
| 2,911,513 | 11/1959 | MacCracken | 126/400 |
| 3,859,980 | 1/1975 | Crawford | 126/426 |
| 3,875,926 | 4/1975 | Frank | 126/433 |
| 3,943,911 | 3/1976 | Yu | 126/445 |
| 3,987,782 | 10/1976 | Meier, Jr. | 126/434 |
| 4,084,578 | 4/1978 | Ishibashi | 126/434 |
| 4,084,579 | 4/1978 | Yu | 126/432 |
| 4,116,222 | 9/1978 | Seifried | 126/435 |
| 4,248,291 | 2/1981 | Jarmul | 126/436 |
| 4,270,523 | 6/1981 | Van Heel | 126/435 |
| 4,313,424 | 2/1982 | Schreyer et al. | 126/433 |

Primary Examiner—James C. Yeung
Attorney, Agent, or Firm—William W. Haefliger

[57] ABSTRACT

A thermosyphon heat pipe hot water appliance combines a solar collector with a heat reservoir wherein fluid vaporized in the collector transfers latent heat to reservoir fluid, for re-transfer to fluid such as water supplied by city reservoirs, or from municipal mains.

10 Claims, 4 Drawing Figures

THERMOSYPHON HEAT PIPE HOT WATER APPLIANCE

BACKGROUND OF THE INVENTION

This invention relates generally to appliances for heating liquid such as water; more particularly the invention concerns a combination solar collector and heat reservoir wherein fluid vaporized in the collector transfers latent heat to reservoir fluid, for re-transfer to fluid such as water supplied from city reservoirs.

There is a need for extending the heating effectiveness of solar collectors during periods such as night time, and temporarily cloudy weather conditions, wherein the solar collector is not receiving solar radiation. In particular, there is a need for a heat reservoir of lightweight compact construction, which can be mounted on a dwelling roof along with the collector. Further, there is a need for such equipment wherein the reservoir and collector are characterized by high operating efficiency, including high heat transfer efficiency, low weight, and small volume.

SUMMARY OF THE INVENTION

It is a major object of the invention to provide method and apparatus meeting the above need. Basically, and in its apparatus respects, the fluid heating assembly of the invention comprises:

(a) a solar collector having an inlet for a first fluid to be heated, and an outlet for the solar heated fluid, (b) a tank for containing a heat transfer second fluid, (c) first ducting in the tank in communication with said collector outlet to receive said heated first fluid and to transfer heat therefrom to the second fluid in the tank, (d) and second ducting in the tank for passing third fluid into and out of the tank, and to transfer heat from the second fluid in the tank to the third fluid in the second ducting.

Typically, frameworks for the collector and tank are integrally connected enabling mounting the assembly as a unit on a roof of a dwelling, with the tank at a higher level than the collector; and the collector is operated to vaporize the first fluid (such as Freon, for example) so that latent heat is efficiently transferred to the second fluid in the tank, at a high temperature.

In its method aspects, the invention includes the steps:

(a) causing solar radiation to heat a first fluid, (b) passing the heated first fluid in heat transfer relation with a body of second fluid for heating the second fluid, (c) and passing a third fluid stream in heat exchange relation with the body of second fluid for transferring heat from said body to said third fluid stream.

The (a) step typically includes vaporizing the first fluid by solar heating thereof, and the (b) step includes condensing the first fluid vapor to transfer latent heat to the body of second fluid.

These and other objects and advantages of the invention, as well as the details of an illustrative embodiment, will be more fully understood from the following description and drawings, in which:

DRAWING DESCRIPTION

DETAILED DESCRIPTION

Figure 1:
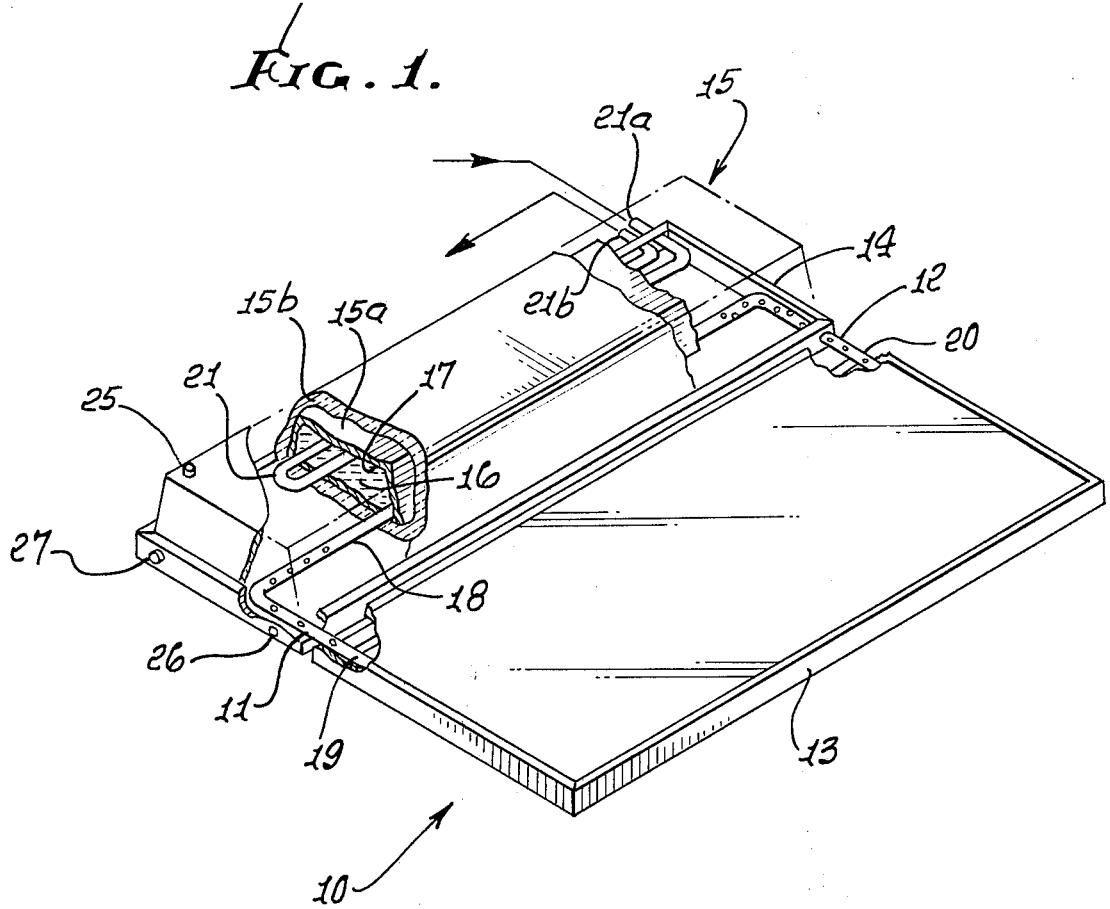
FIG. 1 is a perspective view partly broken away, showing one form of fluid heater assembly incorporating the invention.

In FIG. 1, a solar collector 10 has an inlet (defined by duct 11) for a first fluid to be heated by solar radiation, and an outlet (defined by duct 12) for the solar heated fluid. The collector is shown as carried by a first rectangular frame 13.

A second and smaller rectangular frame 14 carries a tank 15 for containing a heat transfer second fluid 16. The tank is shown as including a metallic liner 15a, and insulation 15b enclosing the lining. The insulation may for example consist of styrofoam, and the metal liner of heat conductive metal such as copper or copper alloy.

First ducting in the tank interior 17 communicates with the solar collector to receive the heated first fluid and transfer heat therefrom to the second fluid body 16 in the tank interior. That ducting is shown for example at 18 in endwise series communication with inlet 11 and outlet 12. First ducting 18 may be intergral with header pipes 19 and 20 in the solar collector, and may advantageously contain Freon to be vaporized in the collector and to be condensed in duct 18, to release latent heat transferred to the body of liquid 16 in the tank.

Second ducting 21 also extends in the tank, in the heated body of liquid 16, for passing third fluid (as for example liquid such as water) into and out of the tank via ports 21a and 21b. The second ducting 21 is heated by the water body 16 and transfers heat to the third fluid flowing in that second ducting 21. Accordingly, the third fluid, such as water to be used in the home, is efficiently heated by the hot liquid reservoir 16, which acts as a heat source during the night or cloudy weather when the solar collector itself is not being heated by the sun's rays; also, the heat storage capacity is enhanced due to latent heat of vaporization release to the water body 16 upon condensation of Freon in the duct 18. All ducts in the tank may consist of copper, or other good heat conductive metal, for efficient heat exchange.

Figure 2:
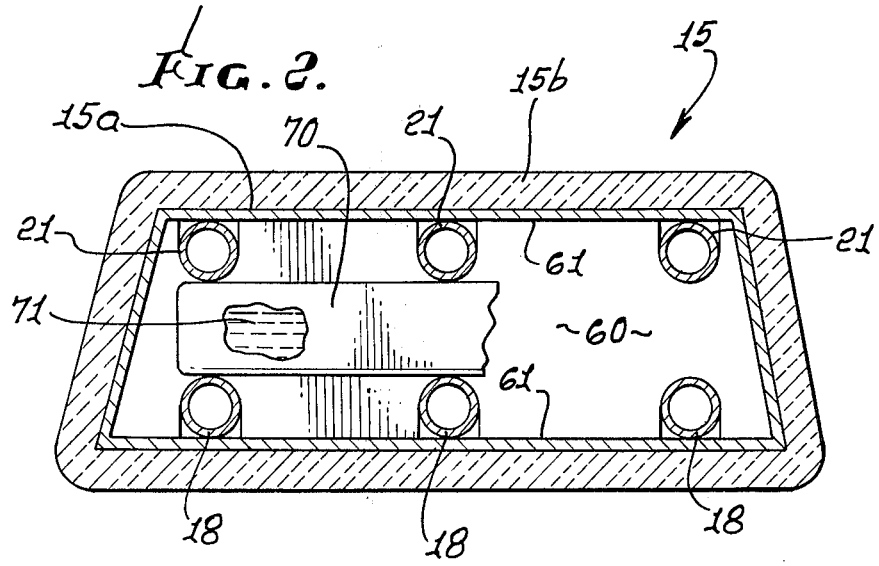
FIG. 2 is a cross section through a tank showing a modified construction.

FIG. 2 shows a modified tank interior construction, wherein heat conductive metallic structure such as webbing 60 contacts (or is connected with) the ducts 18 and 21, as well as the tank walls at 61, to transfer heat from the tank wall and/or from duct 18, by conduction, to duct 21, for increasing the heat transfer efficiency. Fluid 16 may consist of water, and first fluid in duct 18 may consist of Freon or water. In addition, a container 70 may be located between ducts 18 and 21, and in contact therewith. Within the container is a phase change material acting to store thermal energy in its melting phase change. Examples of such materials are paraffin, and magnesium salts, and melting temperatures are for example between 90° and 140° F. Also, the container and its contents transfer heat by conduction from ducts 18 to ducts 21. Container 70 may consist of a plastic bladder. During times of no solar radiation, latent heat is transferred from the material 71 to the second fluid 16, for re-transfer to third fluid in ducting 21.

FIG. 1 also shows tank 15 having a fill port 25 and a drain port 26. A safety vent appears at 27.

Figure 3:
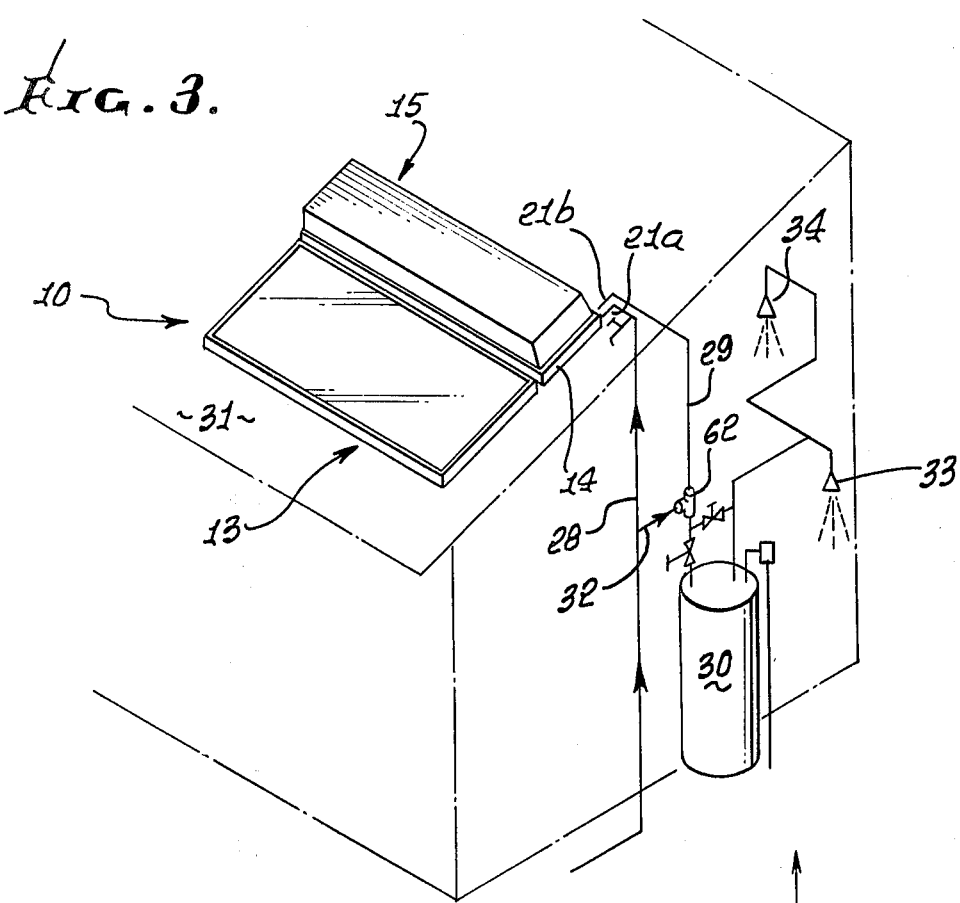
FIG. 3 is a system perspective.

FIG. 3 shows the ports 21a and 21b connected via lines 28 and 29 with a communicating water source and with a hot water storage tank 30. The frames 13 and 14 for the solar collector 10 and tank 15 are interconnected and mounted on a dwelling inclined roof 31, as shown. A shunt line 32 from line 28 connects to a mixing valve 62 in line 29, to allow controllable mixing of hot and cold water feed to tank 30. The latter supplies water outlets 33 and 34 in the dwelling.

Figure 4:
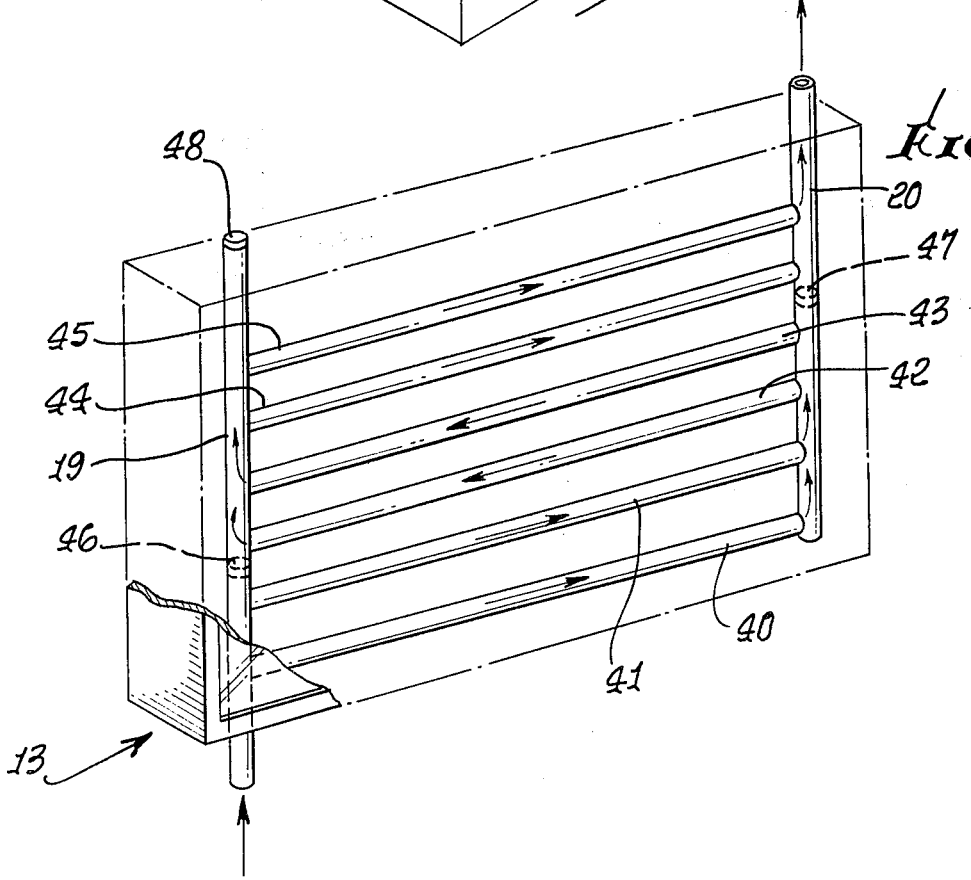
FIG. 4 is a perspective showing details of a solar collector.

FIG. 4 shows a solar collector interior construction with first and second header pipes 19 and 20. Parallel branch pipes 40-45 are connected between the two headers. Plugs 46-48 in the headers, as shown, cause serpentine flow via at least two branch pipes for each traverse between the headers. Thus, plug 46 causes transfer flow via two branches 40 and 41 to header 20; plug 47 in header 20 causes traverse flow via branches 42 and 43 back to header 19, and plug 48 in header 19 causes traverse flow in branches 44 and 45 back to header 20, for discharge to the tank 15. Holes in plugs 46 and 47 may pass a small flow of fluid.

The construction of the solar collector may otherwise follow that described in my U.S. Pat. No. 4,084,579. The headers and branches may be coated with "chrome velvet", a black compound imparting high solar radiation absorptivity, and low infra-red wave emissivity.

In operation, whenever there is sufficient solar irradiation, Freon boils and changes from liquid to vapor phases. This phenomenon is known as boiling liquid heat transfer by latent heat, or a "heat-pipe" principle. Test data indicates that the boiling liquid heat transfer in solar collector panels, as compared to liquid flow process heat transfer in the same collector, is higher by up to 35 percent. The saturated Freon vapor rises to the storage tank and condenses as it transfers the solar energy to the storage reservoir. The condensed and liquefied Freon returns to the bottom of the collector. The process repeats so long as there is sufficient solar irradiation. Because of the highly efficient heat exchanger design, less than 5 percent of losses are experienced through the transfer of heat from the collector to the storage tank. Therefore, a net gain of 20 percent is realized with a boiling liquid transfer process, as compared to the conventional liquid flow heat transfer process in solar collectors.

The second heat exchanger transfer the cold, incoming city water to hot water before it enters the conventional backup water heater. Once again, because of the unique "low loss" design features of the heat exchanger, the leaving hot water is at practically the same temperature as the hot water within the storage tank.

In the event of excess pressure build-up in the second fluid 16, the safety vent or valve at 27 will open to relieve the excess pressure.

The invention is particularly characterized by low weight, low volume, or high heat capacity, as compared with prior systems, as well as by safe guarded "liquid-to-liquid-to-liquid" heat transfer to potable water in ducts 21.

From the foregoing it will be seen that an important purpose of this invention is to achieve an efficient heat transfer process with the three-fluid arrangement. Most of the local health authorities in the United States require two-walled separation of city water and other transfer fluids to reduce the hazard of cross connection. The conventional two-walled heat exchangers available in the market are inefficient because of an air gap separating the two walls. The air gap is a means of visible leak detection. The present invention provides a three-fluid system. The second fluid is contained in an atmospherically vented bladder or tank such that leakage of the first fluid or the second fluid will escape through the second fluid bladder vent. The second fluid, being potable water or distilled water, will transfer heat much more efficiently than the air-gap of the conventional two-walled heat exchanger.

The ductings of the first, second and third fluids are an integral piece (the second fluid bladder is a part of the integral surface as well). The phase change bladder can be plastic material. However, it can also consist of metal to be an integral part of the ducting of the three fluids. The reason for the connected ducting common to all the fluids is to achieve a large extended surface to form a highly efficient heat exchanger. The solar radiation from the first fluid will be transferred from the first fluid ducting to the second fluid through the large extended surface of the first fluid ducting which also extends to the third fluid. The second fluid is a stationary (no flow) potable water or distilled water. It will require that the extended surface of the ducting of the first fluid and the second fluid transfer the heat energy from the first fluid to the second fluid and from the second fluid to the third fluid. Example: the condensing heat transfer coefficient of the first fluid (Freon) is around 150 BTU per sq. ft. per °F. per hour. If the interior duct surface containing the first fluid is 1 sq. ft., the amount of heat transfer through the ducting for the first fluid is 150 BTU per hour from the solar collector with 1° F. temperature rise. The heat transfer rate of the second fluid (no flow) is about 20 BTU per sq. ft. per hour for the 1° F. rise. It will then require 7.5 sq. ft. of the exterior surface of the first fluid ducting to transfer heat from the first fluid to the second. If the ductings for all three fluids are connected, and submerged in the second fluid, it will make the transfer of heat from the first fluid to the second fluid highly efficient. The third fluid, city water, when flowing through the third fluid ducting has a heat transfer rate of approximately 50 BTU per sq. ft. per °F. per hour. If the third fluid ducting is 3 sq. ft., the transferred heat will be 150 BTU per °F. per hour. Once again, the exterior surface of the third ducting must be two and a half times larger to transfer the same amount of second fluid heat to the third fluid. In other words, the common ducting area serves the transfer of the no-flow second fluid from solar energy to the outlet of the third fluid.

There is a further purpose regarding the second fluid being atmospherically vented. The second fluid under sea level conditions is limited by the boiling point of 212° F. This limit also limits the first fluid vapor pressure. Under very intensive solar radiation, the vapor pressure in the solar collector could increase as a function of the collector absorber temperature. The second fluid serves as a heat sink which limits the first fluid vapor to a temperature of a few degrees higher than 212° F. Therefore, it limits the vapor pressure of the first fluid corresponding to that temperature. Also, the safety vent prevents excess pressure build-up of the first fluid.

I claim:

1. In a fluid heater assembly, the combination comprising (a) a solar collector having an inlet for a first fluid to be heated, and an outlet for the solar heated fluid,
(b) a metallic tank for containing heat transfer second fluid,
(c) first ducting in the tank in communication with said collector outlet to receive said heated first fluid and to transfer heat therefrom to the second fluid in the tank,
(d) and second ducting in the tank for passing third fluid into and out of the tank, and to transfer heat from the second fluid in the tank to third fluid in the second ducting,
(e) and including metallic structure via which heat is conducted from said first ducting to said second ducting, said first and second ducting includes generally longitudinally extending stretches in the tank contacted by said metallic structure which extends generally laterally in said second fluid,
(f) said metallic structure comprising webbing contacting said first and second ducting and said tank,
(g) said first and second ducting extending through said webbing the periphery of which is in heat transfer proximity to the tank wall extending about the ducting.

2. The combination of claim 1 including said first fluid which is selected from the group consisting of water and Freon.

3. The combination of one of claims 1 or 2 including said second fluid consisting of water.

4. The combination of one of claims 1 or 2 including said third fluid consisting of water.

5. The combination of claim 1 wherein the tank has a fill port, and an overflow port, for said second fluid.

6. The combination of claim 1 including a framework mounting said collector and said tank.

7. The combination of claim 6 wherein the tank is located above the level of the collector.

8. The combination of claim 1 wherein the solar collector includes a first header pipe connected in series with said inlet and a second header pipe connected with said outlet, branch piping interconnecting said header pipes, and means in at least one header pipe to cause serpentine flow to fluid between the header pipes via at least two branch pipes for each traverse between the header pipes.

9. The combination of claim 1 including a container in the second fluid in the tank, and a heat storing phase change material in the container.

10. The combination of claim 9 wherein the container is in contact with and between said first and second ducting in the tank.

* * * * *

UNITED STATES PATENT AND TRADEMARK OFFICE
CERTIFICATE OF CORRECTION

PATENT NO. : 4,421,100

DATED : December 20, 1983

INVENTOR(S) : Ying-Nien Yu

It is certified that error appears in the above-identified patent and that said Letters Patent is hereby corrected as shown below:

On the title page at (22) after Filed:, "Dec. 20, 1983" should read -- Dec. 22, 1981 --.

Signed and Sealed this

Fourteenth Day of August 1984

[SEAL]

Attest:

GERALD J. MOSSINGHOFF

Attesting Officer  Commissioner of Patents and Trademarks